(12) United States Patent
Schmidt

(10) Patent No.: US 6,922,830 B1
(45) Date of Patent: Jul. 26, 2005

(54) SKIP LIST DATA STORAGE DURING COMPILATION

(75) Inventor: William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 09/626,982

(22) Filed: Jul. 27, 2000

Related U.S. Application Data

(62) Division of application No. 08/936,864, filed on Mar. 10, 2000, now Pat. No. 6,117,185.

(51) Int. Cl.[7] .................................................. G06F 9/45
(52) U.S. Cl. ...................... 717/155; 717/154; 717/151; 717/132; 717/140
(58) Field of Search .................. 717/151, 154–156, 717/131, 132, 140

(56) References Cited

U.S. PATENT DOCUMENTS

| | | | | |
|---|---|---|---|---|
| 5,146,594 A | * | 9/1992 | Iitsuka ........................ | 717/156 |
| 5,193,190 A | * | 3/1993 | Janczyn et al. ............. | 717/156 |
| 5,428,786 A | * | 6/1995 | Sites ........................... | 717/151 |
| 5,517,628 A | * | 5/1996 | Morrison et al. ........... | 712/234 |
| 5,564,045 A | | 10/1996 | Fulling et al. ................. | 707/3 |
| 5,659,739 A | | 8/1997 | Lubbers et al. ............. | 707/102 |
| 5,761,501 A | | 6/1998 | Lubbers et al. ............. | 707/100 |
| 5,937,196 A | * | 8/1999 | Schmidt et al. ............. | 717/155 |
| 5,950,009 A | * | 9/1999 | Bortnikov et al. .......... | 717/158 |
| 5,983,230 A | | 11/1999 | Gilbert et al. ............... | 707/101 |
| 6,064,819 A | * | 5/2000 | Franssen et al. ............ | 717/156 |
| 6,117,185 A | * | 9/2000 | Schmidt ...................... | 717/155 |
| 6,192,513 B1 | * | 2/2001 | Subrahmanyam ........... | 717/155 |
| 6,219,833 B1 | * | 4/2001 | Solomon et al. ............ | 717/149 |
| 6,253,373 B1 | * | 6/2001 | Peri ............................. | 717/150 |

OTHER PUBLICATIONS

TITLE: Evaluation of Predicated Array Data–Flow Analysis for Automatic Parallelization, author: Moon et al, ACM, 1999.*
TITLE: A Comprehensive Approach to Parallel Data Flow Analysis, author: Lee et al, ACM, 1992.*
TITLE: Compiling Dynamic Mappings with Array Copies, author: Fabien Coelho, ACM, 1997.*

(Continued)

*Primary Examiner*—Chameli C. Das
(74) *Attorney, Agent, or Firm*—Wood Herron & Evans LLP

(57) ABSTRACT

A compiler and method of compiling provide enhanced performance by utilizing a skip list data structure to store various properties of a program at points of interest in the procedure, for example, the properties of the statements in each block in the control flow graph. A special procedure is used to initialize the skip list, prior to performing data flow analysis, to ensure that the skip list structure is not used in an inefficient manner as a result of initialization. Furthermore, special procedures are used to simultaneously scan and compare two skip lists as part of solving dataflow equations.

20 Claims, 7 Drawing Sheets

OTHER PUBLICATIONS

TITLE: Using Dataflow Analysis Techniques to Reduce Ownership Overhead in Cache Coherence Protocols, author: Skepstedt et al, ACM, 1996.*

"Concurrent Maintenance of Skip Lists", William Pugh, 1989.*

"Skip Lists: A Probabilistic Alternative to Balanced Trees", William Pugh, 1990.*

"Analysis and Optimization of Imperative Programs", Joseph Hummel, 1993.*

"Complier and run–time support for semi–structured applications", Nikos Chisochoides, 1997.*

Choi et al., *Automatic Construction of Sparse Data Flow Evaluation Graphs*, Proc. 18th Annual ACM Symposium on Principles of Programming Languages, pp. 55–66, Jan. 1991.

Pugh, William, *Skip Lists: A Probabilistic Alternative to Balanced Trees*, Communications of the ACM, Jun. 1990, vol. 33, No. 6, ppgs. 668–676.

Briggs et al., *An Efficient Representation of Sparse Sets*, ACM Letters on Programming Languages and Systems, vol. 2 Nos. 104, Mar.–Dec. 1993, ppgs. 59–69.

Heisch, R.R., *Trace–directed porgram restructuring for AIX executables.*, IBM J. Res. Develop., vol. 38, No. 5, Sep. 1994.

Pettis et al., *Profile Guided Code Positioning*, ACM SIGPLAN '90, Conference on Programming Language Design and Implementation, Jun. 20–22, 1990.

Aho et al., *Compilers: Principles, Techniques, and Tools*, Sections 10.6 and 10.9, pp. 624 and 660, respectively, Addison–Wesley, 1986.

Aho et al., *Compilers, Principles, Techniques and Tools*, Addison–Wesley, pp. 10, 432–446, 1988.

Munro et al., *Deterministic Skip Lists*, ACM Digital Libray, pp. 367–375.

* cited by examiner

| | EXPRESSIONS | | | | | | | | | |
|---|---|---|---|---|---|---|---|---|---|---|
| | 1 | 2 | 3 | 4 | 5 | 6 | 7 | 8 | 9 | •••• |
| IN [B$_1$] | 0 | 0 | 1 | 0 | 0 | 1 | 1 | 0 | 1 | |
| OUT [B$_1$] | | | | | | | | | | |
| GEN [B$_1$] | | | | | | | | | | |
| KILL [B$_1$] | | | | | | | | | | |
| IN [B$_2$] | 0 | 1 | 0 | 0 | 0 | 1 | 1 | 0 | 1 | |
| OUT [B$_2$] | | | | | | | | | | |
| GEN [B$_2$] | | | | | | | | | | |
| KILL [B$_2$] | | | | | | | | | | |
| IN [B$_3$] | | | | | | | | | | |
| OUT [B$_3$] | | | | | | | | | | |
| GEN [B$_3$] | | | | | | | | | | |

SKIP LIST DATA STORAGE DURING COMPILATION

RELATED APPLICATIONS

This application is a divisional application of Ser. No. 08/936,864 filed Mar. 10, 2000, now U.S. Pat. No. 6,117,185 hereby incorporated by reference herein in its entirety.

FIELD OF THE INVENTION

The invention relates to optimizing compilers and methods of compiling. More particularly, the invention relates to optimizing routines used in compiling which require a data flow analysis.

BACKGROUND OF THE INVENTION

Compilers are generally used to transform one representation of a computer program procedure into another representation. Typically, but not exclusively, compilers are used to transform a human readable form of a program such as source code into a machine readable form such as object code.

One type of compiler is an optimizing compiler which includes an optimizer or optimizing module for enhancing the performance of the machine readable representation of a program. Some optimizing compilers are separate from a primary compiler, while others are built into a primary compiler to form a multi-pass compiler. Both types of compilers may operate either on a human readable form, a machine readable form, or any intermediate representation between these forms.

Many optimizing modules of compilers operate on intermediate representations of computer programs or procedures. Typically a program or procedure being translated is broken down into a series of "statements", each of which contains zero or more "operands" or "data items". A data item may be "defined", meaning that it is given a value by the statement, or "used", meaning that its value is fed into the computation represented by the statement. For example, the statement "x=y+z" defines x and uses y and z. Optimization of a program often involves locating individual statements or groups of statements which can be eliminated or rewritten in such a way as to reduce the total number of statements in the program or in a particular flow path through the program. For example, a complicated expression might be computed at two distant points within the same procedure. If the variables used in the expression are not modified to contain different values between the first and second computations, the value can be computed only once, at the first point in the procedure, and saved in a temporary location for use at the second point in the procedure, thus avoiding recomputation at the second point. This particular form of optimization is known as "common (sub)expression elimination".

The main problem in optimizing a procedure is to determine at which points of the procedure various kinds of information are available. For example, to perform common (sub)expression elimination, it is necessary to know at which points the variables used by the procedure are modified. To determine such facts, a dataflow analysis is performed on the program.

To perform dataflow analysis, possible paths of execution through a procedure may be represented by a control flow graph (CFG). Statements may be grouped together into basic blocks, which are maximal sequences of straight-line code. In other words, there is no way to branch into or out of a basic block except at the beginning or end. A CFG is a graph with one node for each basic block in the procedure. The CFG includes an arc from block A to block B if it is possible for block B to be executed immediately after block A has been executed. In such a case, B is called a "successor" of A, and A is called a "predecessor" of B.

The CFG is generated by a forward pass through the procedure to identify basic blocks and transitions between basic blocks, and form an ordered representation of those blocks and the branches between blocks. One well-known approach for ordering the blocks in the CFG is to form a "depth first" ordering of the basic blocks of the program. This approach is described in Alfred V. Aho, Ravi Sethi, and Jeffrey D. Ullman, *Compilers: Principles, Techniques, and Tools*, Addison-Wesley, copyright 1986, reprinted 1988, which is incorporated by reference herein, particularly in sections 10.6 and 10.9. In a depth first ordering, each basic block is assigned a "dfo" number, with the following property: if every path from the start of the program to block Y must pass through block X, then the dfo number for X is less than the dfo number for Y, which is written ddfo(X)<dfo(Y).

After generating a CFG, optimization typically involves computing various properties at points of interest in the procedure, for example, the properties of the statements in each block in the CFG. Often, a matrix of binary values (bits) such as is shown in FIG. 1, is used to identify these properties. In a typical approach, there are several rows 10 in the matrix for each block in the program, each row 10 representing one property of the statements in the block. There is one column 12 in the matrix for each property of interest during optimization. At each row and column location, there is a bit which has either a "1" or a "0" value.

For example, in the matrix shown in FIG. 1, each block B is associated with four rows 10, a row in[B] for identifying expressions that are available upon entry to block B, a row out[B] for identifying expressions that are available upon exit from block B, a row gen[B] for identifying expressions that are generated by statements in block B, and a row kill[B] for identifying expressions whose constituent variables are modified by statements in block B. The columns 12 in the matrix relate to particular expressions, numbered 1, 2, 3 etc. Thus, the "1" located in the row for in[$B_2$] and the column for expression 6, indicates that expression 6 is available upon entry to block $B_2$; the "0" located in the row for in[$B_1$] and the column for expression 2, indicates that expression 2 is not available upon entry to block $B_1$.

A difficulty that arises with the representation shown in FIG. 1, is that in practice, most of the bits in the matrix are zero (i.e., the matrix is "sparse"). In a typical case where the bits in the matrix relate to the status of particular expressions, the matrix is typically sparse because, normally, specific expressions are only used or useful in a small portion of a procedure. A large, sparse bit matrix not only consumes large quantities of space, but also requires a large amount of time to repeatedly scan in the manner needed for complex dataflow analysis.

SUMMARY OF THE INVENTION

The invention addresses these and other problems associated with the prior art by utilizing a skip-list data structure for representing properties of points of interest in a procedure. When sets thus represented are sparse, this data structure substantially reduces the storage space required for storing such properties, and can be scanned much more rapidly than the corresponding sparse bit matrix.

Specifically, in one aspect, the invention features a method of storing properties associated with a computer procedure, in a linked list of data storage nodes. Each of the nodes in the linked list stores a property of the computer procedure, and the nodes are ordered in accordance with a predetermined property order. When a new property is associated with the computer procedure, a data storage node for the property is generated and added to the linked list. Each data storage node includes a data storage space for storing an identifier of a property, and at least a first pointer storage space for storing a pointer identifying a location of an other data storage node. The data storage space of each data storage node stores an identifier of the new property for which the node was allocated. The first pointer storage space of each data storage node stores a pointer identifying a location of an other data storage node, specifically, the pointer identifies a subsequent node in the linked list.

In disclosed specific embodiments, the linked list includes data storage nodes of either a first smaller size or a second larger size; the sizes of the data storage nodes are randomly selected. The data storage nodes of the second larger size include a second pointer storage space for storing a pointer identifying a location of an other data storage node. The pointer stored into the second pointer storage space identifies the location of the next subsequent data storage node of the second larger size.

In the disclosed specific embodiment, when a property is disassociated with the computer procedure, the associated data storage node becomes dispensable and is deleted.

In accordance with a second aspect of the invention, a special procedure is used to initialize skip lists, prior to performing data flow analysis, to ensure that the skip list structure is not used in an inefficient manner as a result of initialization, particularly where an iterative dataflow analysis technique is used in which iterations of the analysis do not increase the membership of the property sets. Specifically, each basic block of a computer procedure is associated with sets of entry properties and exit properties, as well as property modifications caused by the basic block. The basic blocks are then selected and initialized in a predetermined order. The entry properties of the currently selected basic block, are copied from exit properties of a previously selected and processed basic block. Next, the exit properties for the currently selected basic block, are computed from the entry properties and the property modifications associated with the currently selected basic block.

In the disclosed specific embodiment, the entry and exit properties are sets of expressions available upon entry and exit from the basic block, and the property modifications are expressions generated and killed by the basic block. Also, to further improve the initialization of sets for a basic block, any expressions not found in the sets of expressions available upon exit from all previously selected and processed control flow predecessors of the currently selected basic block, are removed from the set of expressions available upon entry to the currently selected basic block.

In a third aspect, the invention features the structure of the linked list per se. Specifically, this structure includes a plurality of data storage nodes, each data storage node including a data storage space for storing an identifier of a property and at least a first pointer storage space for storing a pointer identifying a location of an other data storage node. The data storage space of each node stores an identifier of a first property for which the node was allocated, and the first pointer storage space of each data storage node stores a pointer identifying a location of an other data storage node, the other data storage node storing a second property associated with the computer procedure that is subsequent to the first property in a predetermined property order.

In a further aspect, the invention features a computer system for compiling a computer procedure into a machine-readable representation, comprising an optimizer that optimizes the computer procedure into an optimized representation by storing and manipulating properties associated with the computer procedure in accordance with the aspects described above.

In still a further aspect, the invention features a program product configured to store properties associated with a computer procedure, in a linked list of data storage nodes in accordance with the aspects described above, and a signal bearing media bearing the program, which may be a transmission type media or a recordable media.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described embodiments of the invention.

DETAILED DESCRIPTION

Prior to discussing the operation of embodiments of the invention, a brief overview discussion of compilers and compiling techniques is provided herein.

Overview of Compilers

Compilers and the like are generally known in the art. One known type of compiler is a multi-pass optimizing compiler, which includes a front-end module for converting source code into an intermediate representation, and a back-end module which takes the intermediate representation and generates object code.

The front-end module of a multi-pass optimizing compiler typically includes a lexicographic analyzer which identifies tokens or keywords in the source code, and a parser which analyzes the program statement by statement. The parser typically uses a context-free grammar to determine if program statements satisfy a set of grammar rules, and builds constructs. The parser then generates an intermediate representation using an intermediate code generator.

The back-end module of a multi-pass optimizing compiler typically includes an optimizer or optimizing module which operates on the intermediate representation to generate a revised or optimized intermediate representation. Several different optimizations may be performed, including but not limited to local optimizations such as value numbering, elimination of redundant computations, register allocation and assignment, instruction scheduling to match specific machine characteristics, moving invariant code out of loops, strength reduction, induction variable elimination, and copy propagation, among others. The back-end module also includes a final code generator to generate the object code from the revised intermediate representation.

A compiler may reside within the memory of the computer system upon which the object code generated by the compiler is executed. Alternatively, a compiler may be a cross-compiler which resides on one computer system to generate object code for execution on another computer system. Either type of compiler may be used consistent with the invention.

One suitable back-end module for use with the invention is an AS/400 optimizing translator supplied with an AS/400 minicomputer, which is a common back-end module of an optimizing compiler. This product may be used with a front-end module such as the ILE C Compiler available from IBM, among others. It will be appreciated that other compilers are suitable for different languages and/or different hardware platforms, and may also be used in the alternative.

Computer System

Figures 1, 2:
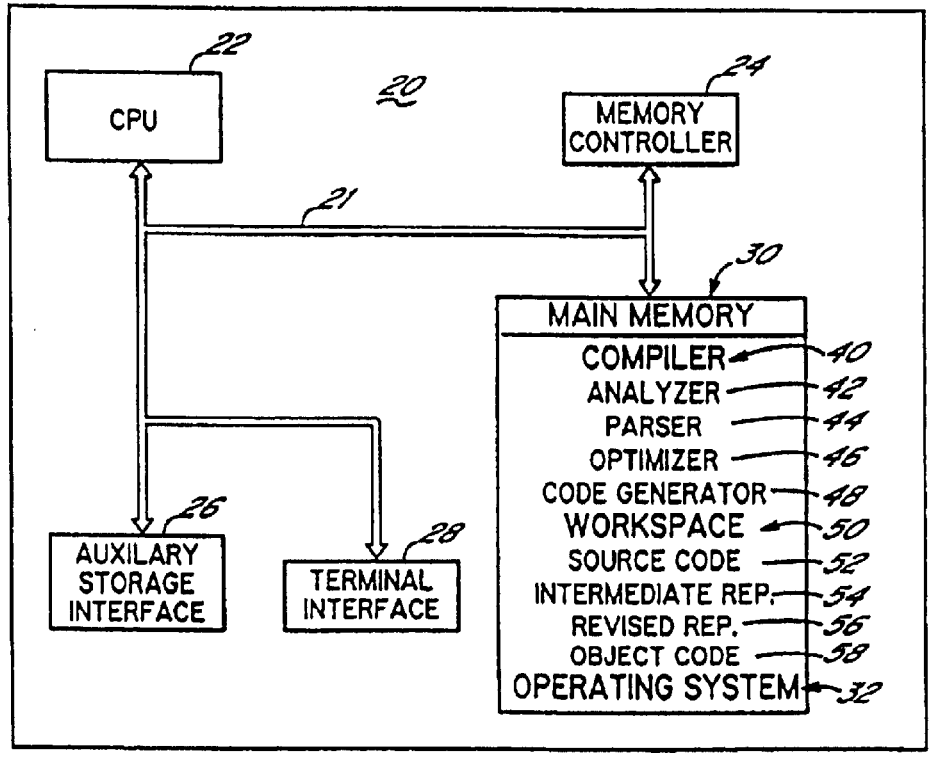
FIG. 1 is a data structure diagram illustrating the use in the prior art of a bit matrix to represent properties of points of interest in a computer procedure.
FIG. 2 is a block diagram of a computer system consistent with the invention.

Turning to the Drawing, wherein like numbers denote like parts throughout the several views, FIG. 2 shows a block diagram of a computer system 20 consistent with the invention. Computer system 20 is an IBM AS/400 minicomputer. However, those skilled in the art will appreciate that the mechanisms and apparatus consistent with the invention apply equally to any computer system, regardless of whether the computer system is a complicated multi-user computing apparatus or a single user device such as a personal computer or workstation. As shown in FIG. 2, computer system 20 includes a main or central processing unit (CPU) 22 connected through a system bus 21 to a main memory 30, a memory controller 24, an auxiliary storage interface 26, and a terminal interface 28.

Auxiliary storage interface 26 allows computer system 20 to store and retrieve information from auxiliary storage such as magnetic disk, magnetic tape or optical storage devices. Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 of the embodiment is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Terminal interface 28 allows system administrators and computer programmers to communicate with computer system 20, normally through programmable workstations. Although the system depicted in FIG. 2 contains only a single main CPU and a single system bus, it will be understood that the invention also applies to computer systems having multiple CPUs and buses.

Main memory 30 is shown storing a compiler 40 (comprising analyzer 42, parser 44, optimizer 46 and code generator 48) and operating system 32. Memory 30 also includes a workspace 50, which is shown storing a computer program in various stages of compilation, including a source code representation 52, an intermediate representation 54, an optimized representation 56 and object code 58. However, it should be understood that main memory 30 will not necessarily always contain all parts of all mechanisms shown. For example, portions of compiler 40 and operating system 32 will typically be loaded into caches in CPU 22 to execute, while other files may well be stored on magnetic or optical disk storage devices. Moreover, the various representations 52–58 of a computer program may not be resident in the main memory at the same time. Various representations may also be created by modifying a prior representation in situ. In addition, as discussed above, the front-end and back-end modules in some systems may be separate programs.

It will be appreciated that computer system 20 is merely an example of one system upon which the routines may execute. Further, as innumerable alternative system designs may be used, principles of the present invention are not limited to any particular configuration shown herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Use of Computer System

Figure 3A:
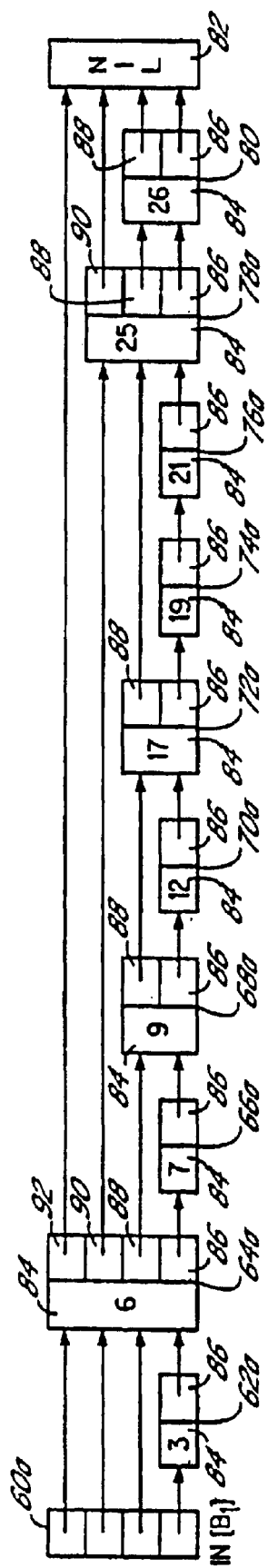
FIGS. 3A and 3B are data structure diagrams illustrating skip list data structures representing the information found in two rows of the bit matrix of FIG. 2.
Figure 3B:
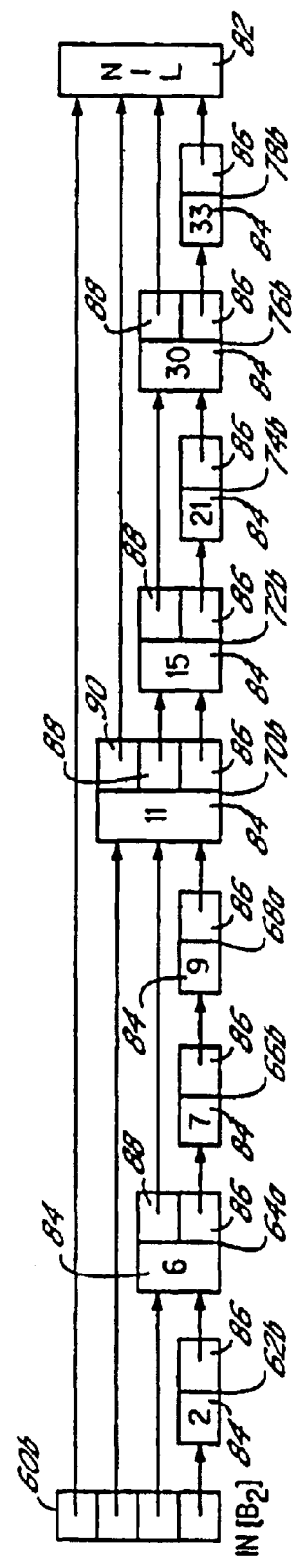

Referring now to FIGS. 3A and 3B, an explanation can be provided of the skip list data structure of the kind used in accordance with principles of the present invention. The skip list illustrated in FIG. 3A stores the set of properties in[$B_1$], specifically, the set of expressions available upon entry to basic block $B_1$ of the computer procedure currently undergoing compilation. The skip list illustrated in FIG. 3B stores the set of properties in[$B_2$], specifically, the expressions available upon entry to basic block $B_2$ of the computer procedure currently undergoing compilation.

As seen in FIGS. 3A and 3B, each skip list begins with an initial data storage node 60$a$ and 60$b$, and includes a number of data storage nodes 62$a$/62$b$, 64$a$/64$b$, 66$a$/66$b$, 68$a$/68$b$, 70$a$/70$b$, 72$a$/72$b$ etc. Each node includes a storage space 84 for storing a key for a property of the computer procedure.

For example, the skip list shown in FIG. 3A, which identifies those expressions which are available upon entry to basic block $B_1$, includes nodes storing the keys "3", "6", "7", "9", "12", "17", "19", "21", "25" and "26", thus indicating that the expressions associated with these keys are available upon entry to basic block $B_1$.

The nodes in a skip list are one of a number of sizes. Nodes of the smallest size (which will be referred to as "size 1"), such as nodes 62a and 62b, include only (a.) a storage space 84 for storing a key of a property of the computer procedure, and (b.) a storage space 86 for storing a "level 1" pointer (computer memory address) indicating the location of the next node in the skip list. Nodes of the next larger size (which will be referred to as "size 2"), such as nodes 68a and 64b, include storage spaces 84 and 86, and in addition, include a storage space 88 for storing a "level 2" pointer indicating the location of a subsequent node in the skip list. Specifically, the level 2 pointer in storage space 88 indicates the location of the next node in the skip list of at least size 2.

The skip lists illustrated in FIGS. 3A and 3B also include "size 3" nodes (e.g., nodes 78a and 70b) which include, in addition to the storage spaces 84, 86 and 88 found in a size 2 node, an additional pointer storage space 90 for storing a "level 3" pointer to the next node in the skip list of at least size 3. Furthermore, the skip list of FIG. 3A includes a "size 4" node 64a, which includes, in addition to the storage spaces 84, 86, 88 and 90 found in a size 3 node, a "level 4" additional pointer storage space 92 for storing a pointer to the next node in the skip list of at least size 4.

The maximum number of levels for skip list nodes is arbitrary, and may, in one embodiment, be selected based on the criteria identified by the above-referenced paper by Pugh.

Skip lists terminate at a "NIL" node 82. The level 1 pointer of the last node in the skip list points to the NIL node 82. Furthermore, the level 2 pointer of the last node in the skip list of at least size 2, points to the NIL node. The level 3 pointer of the last node in the skip list of at least size 3, points to the NIL node. The level 4 pointer of the last node in the skip list of at least size 4, points to the NIL node.

The keys for properties stored in a skip list, are generated so that the keys can be sorted in a predetermined, defined order, in order to simplify the process of performing a membership test of a set represented by a skip list. In the example below where the skip lists store sets of expressions related to the computer procedure, a set of keys with a predetermined ordering can be created, for example, by numbering each expression as it is encountered during a scan of the entire program in depth-first order. Then, these numbers can be used as the keys in the skip list data storage fields 84. To facilitate processing, the key for the NIL node is the highest number that can be represented in the data format used to store the keys, so that the key of the NIL node is always numerically greater than any other key in a skip list.

Specific details on the use of skip lists, including the process for scanning a skip list to perform a membership test, methods for randomly selecting the size of skip list nodes, and further descriptions of the advantages of skip lists, can be found in William Pugh, *Skip Lists: A Probabilistic Alternative to Balanced Trees*, Communications of the ACM, Jun. 1990, Vol. 33, Number 6, Pages 668 to 676, which is hereby incorporated herein in its entirety.

Figure 4:
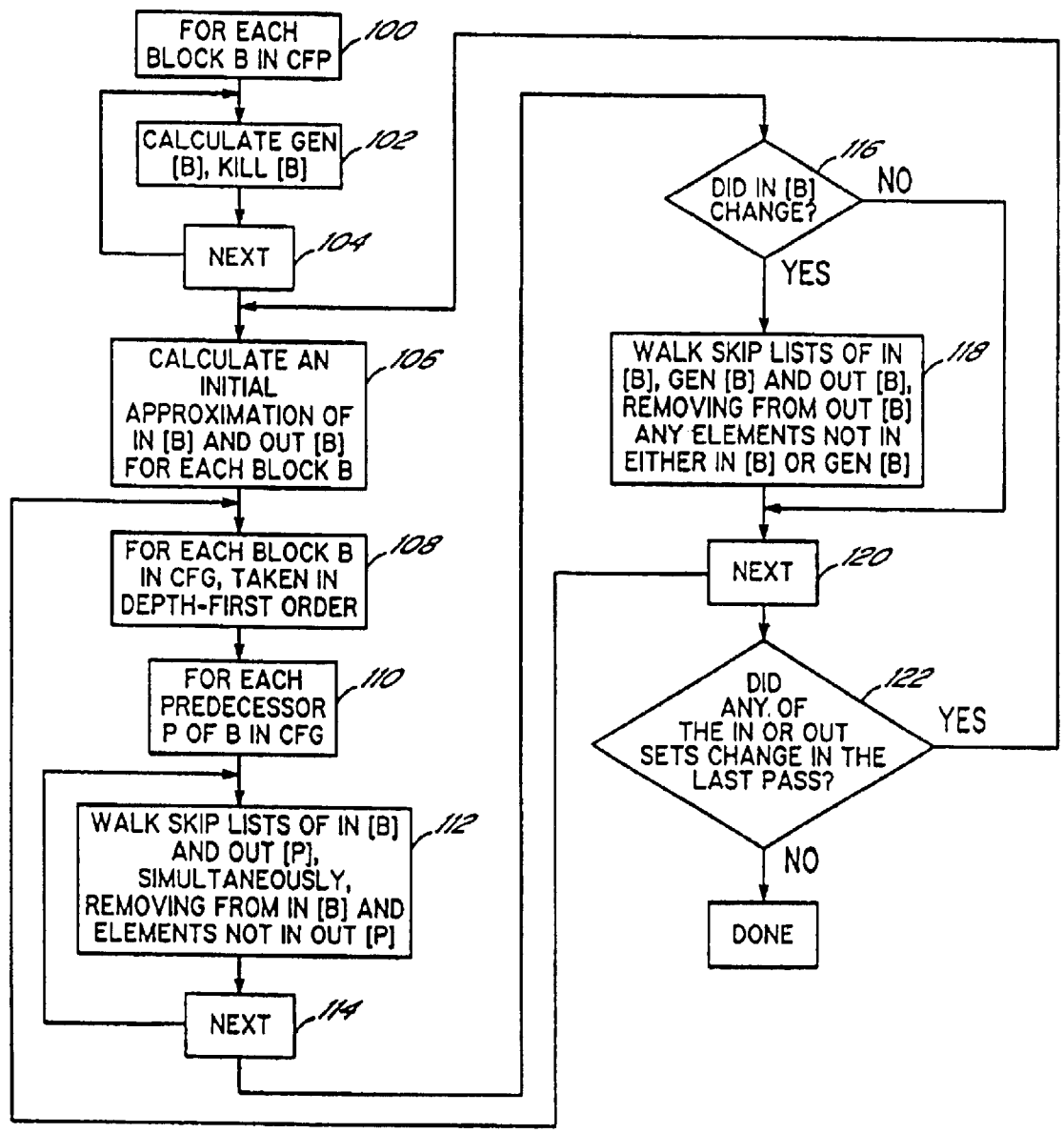
FIG. 4 is a flow chart of specific operations performed as part of a data flow analysis using skip list data structures such as shown in FIGS. 3A and 3B.

Referring now to FIG. 4, the process for performing data flow analysis using the data structures discussed above can be more completely explained. Specifically, for initialization, a loop 100, 102, 104 is performed. In this loop, for each block B in the CFG (step 100), the properties gen[B] and kill[B] are computed for the block (step 102), and the next block is selected (step 104), until all blocks have been processed. This step involves adding a node to the skip lists storing gen[B] and kill[B] for each expression to be included in those sets. Details on the process for adding a node to a skip list can be found from the above-referenced paper by Pugh. Details on methods for identifying expressions to be included in gen[B] and kill[B] as part of step 102 are described in the above-referenced section of the Aho et al. book.

After computing the properties gen[B] and kill[B], processing continues to step 106, in which an initial approximation of the sets in[B] and out[B] are computed for each basic block B. Details on this initialization process are set forth below with reference to FIG. 5.

After the appropriate initialization has been performed, a loop including steps 108, 110, 112, 114, 116, 118, 120 and 122 is performed to make a dataflow analysis on the program and specifically the basic blocks thereof, to obtain final representations of in[B] and out[B], which can then be used in subsequent program optimizations such as common (sub) expression elimination. Each of steps 110, 112, 114, 116 and 118 is performed for each block B in the CFG (step 108) until all blocks have been processed (step 120).

For each block, taken in depth-first order, a second loop including 110, 112 and 114 is performed, for the purpose of eliminating expressions that are not available upon exit of the predecessors of that block. Specifically, for each predecessor P of the currently selected block B (step 110), the skip lists storing the sets in[B] and out[P] are "walked", or scanned, simultaneously, removing from in[B] any expressions not found in out[P] (step 112). Further details on the operations performed in connection with step 112 are provided below with reference to FIG. 6A. Step 112 is repeated for each predecessor P until all predecessors have been processed (step 114).

After completing this loop for each predecessor P of the currently selected block B, in step 116, it is determined whether in[B] was changed as a result of steps 110, 112 and 116. (Note that the only change that might be made to in[B] is the removal of one or more members from the set of expressions represented by in[B].) If there have been changes to in[B], then processing proceeds to step 118, in which out[B] for the same block is updated to reflect the changes to in[B]. Specifically, the skip lists which store a representation of in[B], out[B], and gen[B], are simultaneously "walked", or scanned, to identify those nodes of out[B] which should be removed as a result of the changes to in[B]. Further specific details on this process will be provided in connection with FIG. 6B.

After out[B] has been updated through step 118, or immediately after step 116 if in[B] has not changed, the next block B in the CFG is selected, and processing returns to step 110. This process repeats until every block B in the CFG has been processed, at which time, processing proceeds to step 122. In step 122, it is determined whether any of the in[.] or out[.] sets, for any of the blocks in the CFG, were changed as a result of the previous pass through the blocks in the steps of loop 108, 110, 112, 114, 116, 118, 120. If so, then another pass through the blocks must be performed, and processing returns to step 108. However, if none of the in[.] and out[.] sets have changed in the previous pass, then correct final versions of the in[.] and out[.] sets have been achieved, and the data flow 4 analysis is completed.

Subsequently, the sets for in[.] and out[.] can be used in various optimizations, such as common sub-expression elimination. (Other methods may be used to select blocks to process and the order of processing, for example, a "worklist" approach could be used, in which a block is only processed if any of its predecessors changed since the last pass.)

Figure 5:
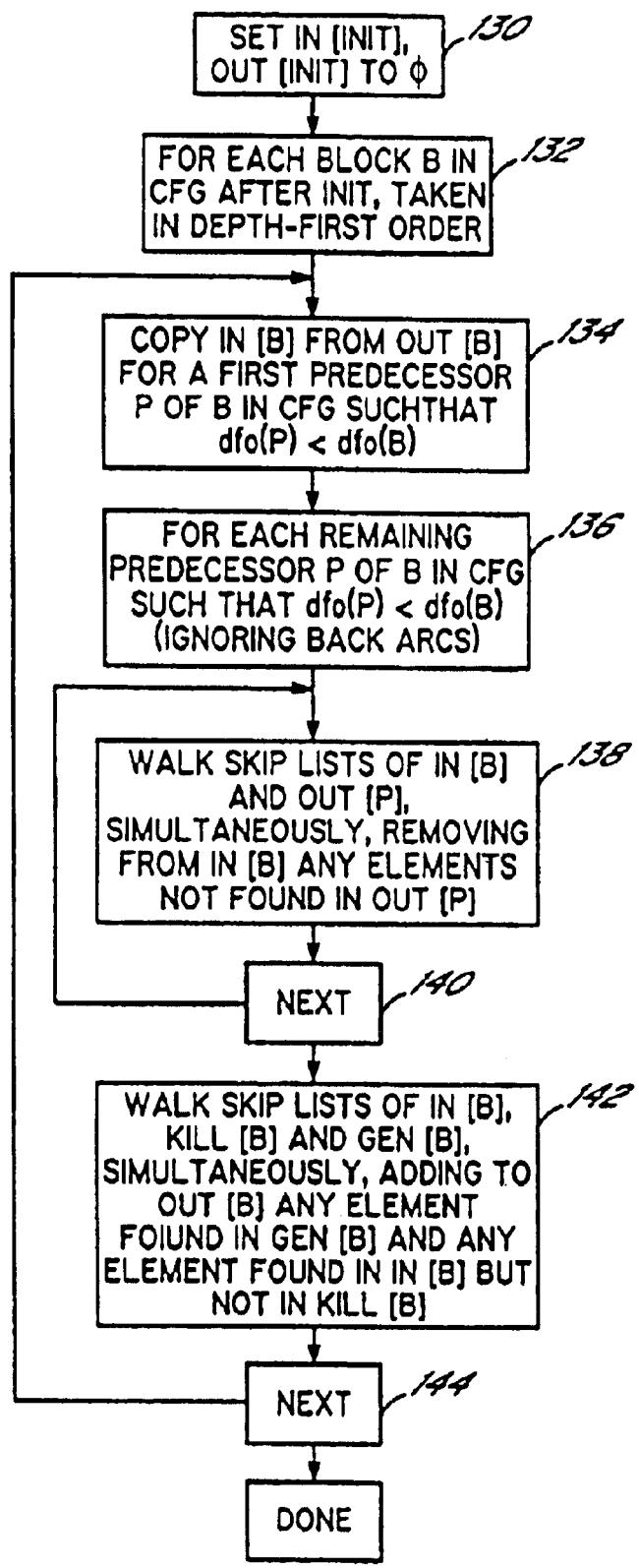
FIG. 5 is a flow chart of specific operations performed as part of initializing skip list data structures such as shown in FIGS. 3A and 3B, for the data flow analysis process of FIG. 4.

Referring now to FIG. 5, the process for calculating an initial approximation can be described in greater detail. As is noted above, the process for updating the in[.] and out[.] sets illustrated in FIG. 4, updates these sets by removing those members which are determined to be unavailable upon entry and upon exit from specific blocks. Typically, a dataflow analysis process of this kind is initialized by including all possible expressions into in[B] and out[B] for every block B in the CFG, and then using a dataflow analysis to remove expressions in an iterative manner analogous to that shown in FIG. 4, until final resulting sets of expressions are obtained.

While this method of initializing the sets in[.] and out[.] is effective when these sets are represented as bit vectors as is shown in FIG. 1, where densely populated sets can be efficiently represented, this method is not effective when these sets are represented as skip lists such as is shown in FIGS. 3A and 3B, because skip lists are intended for use in representing sparsely populated sets and are not efficient in representing densely populated sets.

Therefore, in accordance with principles of the present invention, a novel methodology is used to initialize the sets in[.] and out[.]. This methodology is based on the recognition that (1) the dataflow analysis conducted in accordance with FIG. 4 only reduces the number of members in these sets, and (2) it is only necessary that in[.] and out[.] initially include all members that might be included after dataflow analysis. If a simplified analysis of the blocks B in the CFG can identify all of the members that might possibly be included in the in[.] and out[.] sets after a complete data flow analysis, then only those members that might possibly be included need be included when the in[.] and out[.] sets are initialized.

To perform an appropriate initialization, therefore, in accordance with principles of the present invention, a single forward pass is made through the CFG, initializing the in[.] and out[.] sets by assuming that, in any given block B, all expressions available on exit from all control flow predecessors of block B that appear earlier in the depth-first order than block B, will be available in block B.

Specifically, in a first step 130, sets are generated for an initial block Init, which by definition precedes the first block in the CFG. The sets in[Init] and out[Init] for the block Init are initialized to be empty. Then, beginning at step 132, a loop, including steps 134 through 142 is performed for each block in the CFG, taken in depth-first order.

In the first step 134, the set in[B] for the current block B is copied from out[P] for a predecessor block P of the block B (where the predecessor P satisfies the requirement that dfo(P)<dfo(B)). This makes a first approximation for in[B], based on knowledge that no expression is available upon entry to block B unless it is available on exit from every predecessor P of B. Thus, the first approximation of in[B] formed by this step will include every expression that might be in the final set for in[B] after a complete dataflow analysis.

After computing this initial approximation, beginning at step 136, a loop, including step 138, is performed for each remaining control flow predecessor P of block B which satisfies the requirement that dfo(P)<dfo(B). Specifically, any expressions in the approximation for in[B] which are not available upon exit from any qualifying predecessor, are removed from in[B]. Specifically, in step 138, the skip lists representing in[B] and out[B] are simultaneously "walked", or scanned, to remove from in[B] any nodes not found in out[P]. Specific details of the operations involved in step 138 are detailed below with reference to FIG. 6A.

At step 140, step 138 is repeated until every predecessor P has been considered. The resulting iterative loop improves the approximation for in[B] formed in step 134 by limiting in[B] to those expressions which are available upon exit from all predecessor blocks P appearing prior to B in the depth-first ordering.

After all predecessors P for a block have been processed through step 138, processing continues to step 142, at which an initial approximation of out[B] is generated. Specifically, out[B] is approximated from in[B] by adding to in[B] all expressions generated by block B (as represented by the previously-computed set gen[B]), and removing from in[B] any expressions killed by block B (as represented by the previously-computed set kill[B]). To make this approximation, the skip lists for in[B], kill[B] and gen[B] are "walked", or scanned, simultaneously, adding to out[B] any nodes found in gen[B] and any nodes found in in[B] but not in kill[B]. Details on this operation are described below in connection with FIG. 6C.

After step 142, at step 144, control is returned to step 134 to process the next block B in the CFG taken in depth-first order, until all blocks B have been so processed. Once all blocks B have been processed, the sets in[B] and out[B] are appropriately initialized so that these sets have an initial approximation of their final contents which contains all of the members that might be included after a complete dataflow analysis according to FIG. 4, without including all expressions into these sets and thus incurring inefficient storage.

Figure 6A:
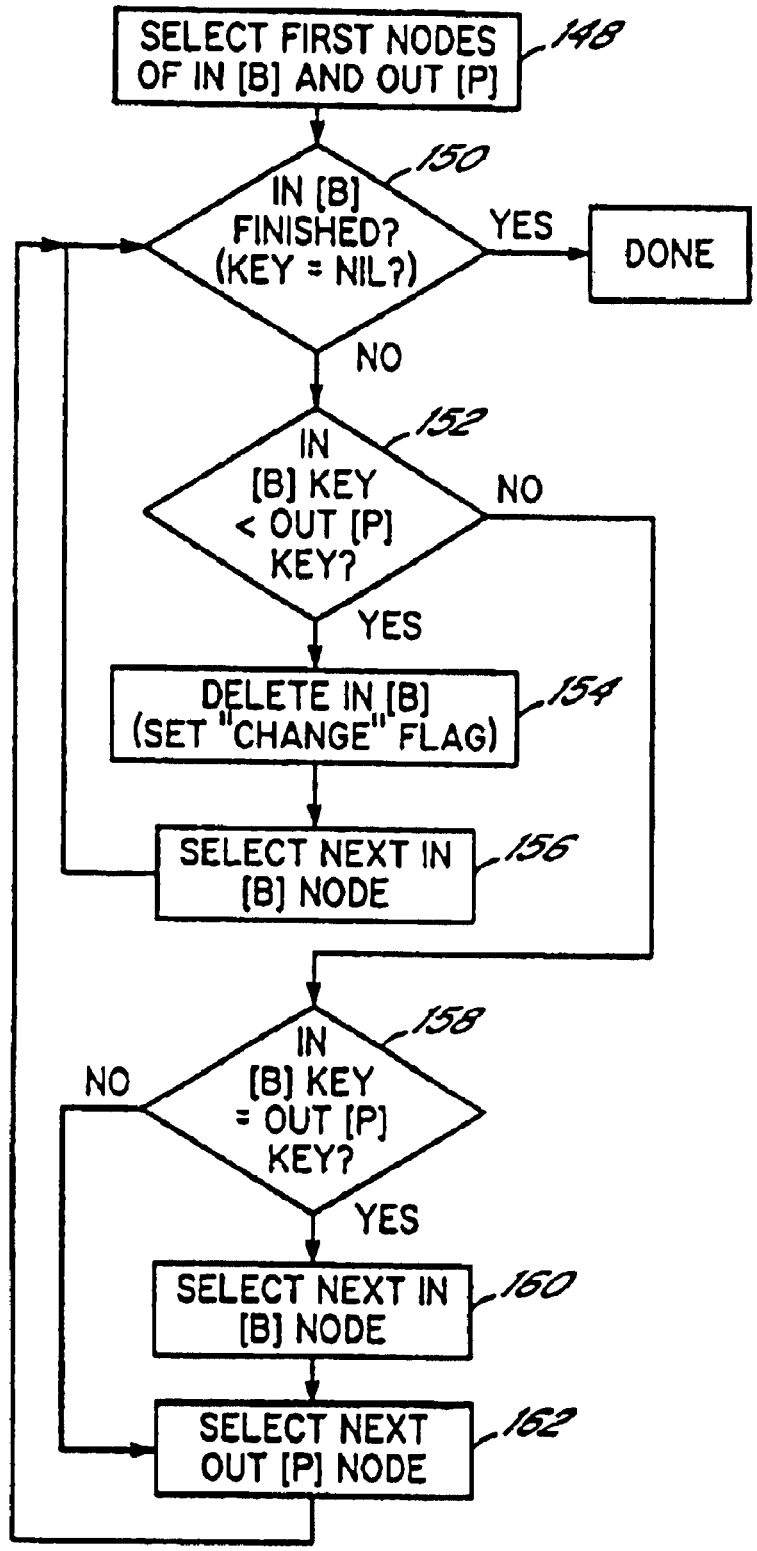
FIG. 6A is a flow chart of specific operations performed as part of simultaneously scanning two skip lists and removing from one list any nodes not in the other, as part of the data flow analysis and initialization processes of FIGS. 4 and 5.

Referring now to FIG. 6A, details of the operations performed in steps 112 (FIG. 4) and 138 (FIG. 5) to walk the skip lists of in[B] and out[P] simultaneously, removing from in[B] any nodes not found in out[P]. As a first step in this process, in step 148, the first nodes in the skip lists for in[B] and out[P] are selected. Next, in step 150 it is determined whether the end of the skip list representing in[B] has been reached, which is determined by determining whether the key of the current node of the in[B] skip list is the highest integer, which is the key of the "NIL" node 82. If so, no further processing is needed and the operation is done.

However, if in step 150 the end of the in[B] skip list has not been reached, then, in step 152, it is determined whether the key in the current node in the out[P] skip list, follows the key in the current node in the in[B] skip list in the predetermined key order. If so, this indicates that the expression represented by the current node in the in[B] skip list, is not present in the out[P] skip list. (Note that if the end of the out[P] skip list has been reached, then the key of the current node in the out[P] skip list is greater than any key in the in[B] skip list, and thus the current and all subsequent nodes in the in[B] skip list should be removed and are removed by repetitions of steps 154, 156, 150 and 152, until the end of the in[B] skip list is reached.) When the current node in the in[B] skip list is not present in the out[P] skip list, processing proceeds to step 154, where the current node in the in[B] skip list is deleted. (Details on the process for deleting a node from a skip list can be found in the above-referenced paper by Pugh.) As part of deleting the current node in in[B], a flag may be set, so that it can later be determined (in step 116, FIG. 4) that in[B] was changed. After deleting the current node in the in[B] skip list, in step 156, the next node in the in[B] skip list is selected (by following the level 1 pointer of the current node to the first subsequent node), and processing returns to step 150.

If, in step 152, the key in the current node in the out[P] skip list, does not follow the key in the current node in the in[B] skip list in the predetermined key order, then processing continues to step 158. In step 158, it is determined whether the key in the current node in the in[B] skip list is equal to the key in the current node in the out[P] skip list. If not, then the key in the current node in the out[P] skip list must precede the key in the current node in the in[B] skip list, and accordingly, processing proceeds to step 162, where the next expression in the out[P] skip list is selected (by following the level 1 pointer of the current node), after which processing returns to step 150.

If, however, in step 158, it is determined that the keys in the current nodes in the in[B] and out[P] skip lists are equal, then the expression represented by the current node in the in[B] skip list is in out[P], in which case, the next expression in the in[B] and out[P] skip lists should be evaluated. Thus, in this case, processing proceeds to step 160. In step 160, the next node in the in[B] list is selected (by following the level 1 pointer of the current node), and then processing proceeds to step 162, where the next node in the out[P] skip list is selected.

Figure 6B:
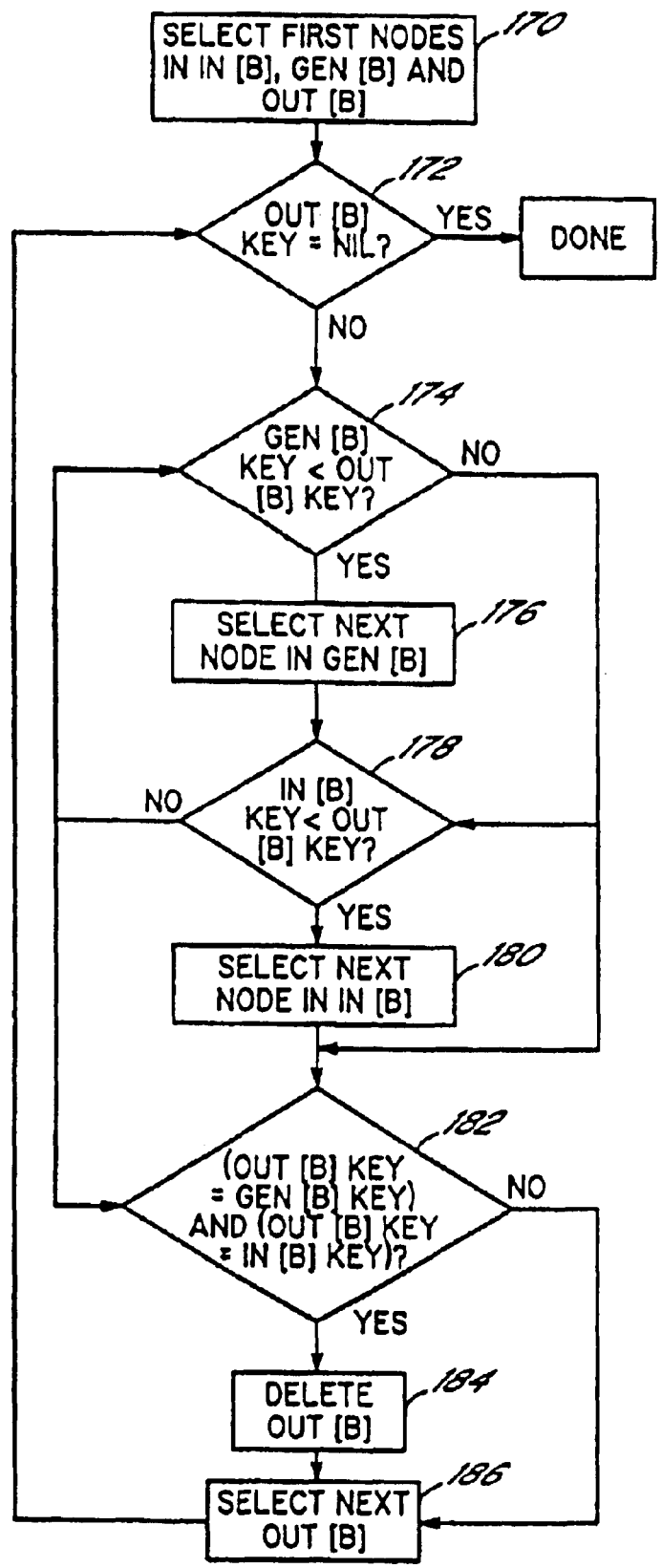
FIG. 6B is a flow chart of specific operations performed as part of simultaneously scanning three skip lists and removing from one list any nodes not in one of the others, as part of the data flow analysis process of FIG. 4.

Referring now to FIG. 6B, the processing of step 118 (FIG. 4) can be described in more detail. In this step, the skip lists for in[B], gen[B] and out[B] are walked together, removing from out[B] any nodes not in either of in[B] or gen[B].

To begin this process, in step 170 the first nodes in the in[B], gen[B] and out[B] nodes are selected. Next, in step 172, the current node in the out[B] list is evaluated, to determine whether the end of the out[B] skip list has been reached (by comparing the key for the current out[B] node to the largest possible integer, which is used in the NIL node). If the end of the out[B] skip list has been reached, then processing is done.

If the end of the out[B] skip list has not been reached, however, then processing proceeds to step 174, in which the key of the current node in the gen[B] skip list is compared to the key of the current node of the out[B] skip list. If the key of the current node in the out[B] skip list follows the key of the current node in the gen[B] skip list in the predetermined key ordering, then processing proceeds to step 176, and the next node in the gen[B] skip list is selected (by following the level 1 pointer of the current node in the gen[B] skip list), and then returns to step 174. This small loop including steps 174 and 176 continues to select subsequent elements in the gen[B] skip list until the key of the current element in gen[B] is either equal to or follows the key of the current node in the out[B] skip list. Once the key of the current node in the gen[B] skip list is either equal to or follows the key in the current node in the out[B] skip list, processing proceeds to step 178.

In step 178, the key of the current node in the in[B] skip list is compared to the key of the current node of the out[B] skip list. If the key of the current node in the out[B] skip list follows the key of the current node in the in[B] skip list in the predetermined key ordering, then processing proceeds to step 180, and the next node in the in[B] skip list is selected (by following the level 1 pointer of the current node in the in[B] skip list), and then returns to step 178. This small loop including steps 178 and 180 continues to select subsequent elements in the in[B] skip list until the key of the current element in in[B] is either equal to or follows the key of the current node in the out[B] skip list. Once the key of the current node in the in[B] skip list is either equal to or follows the key in the current node in the out[B] skip list, processing proceeds directly to step 182.

In step 182, the key of the current node in the out[B] skip list is compared to the keys of the current nodes in the gen[B] and in[B] skip lists. It the key of the current node in the out[B] skip list is not equal to either of the keys in the current nodes of the gen[B] or in[B] skip lists, then it can be determined that the expression represented by the key of the current node of the out[B] skip list is not in either gen[B] or in[B]; therefore, in this case, processing proceeds to step 184, and the current node in the out[B] skip list is deleted (details on the process for deleting a node from a skip list can be found in the above-referenced paper by Pugh). After step 184, the next element in the out[B] skip list is selected in step 186, and processing returns to step 172. However, if in step 182 the key of the current node in the out[B] skip list is equal to either or both of the keys in the current nodes of the gen[B] or in[B] skip lists, then the expression represented by the key of the current node of the out[B] skip list is in one of gen[B] or in[B]; therefore, in this case, processing proceeds to directly to step 186, and the next node in out[B] is selected, after which, processing returns to step 172.

Figure 6C:
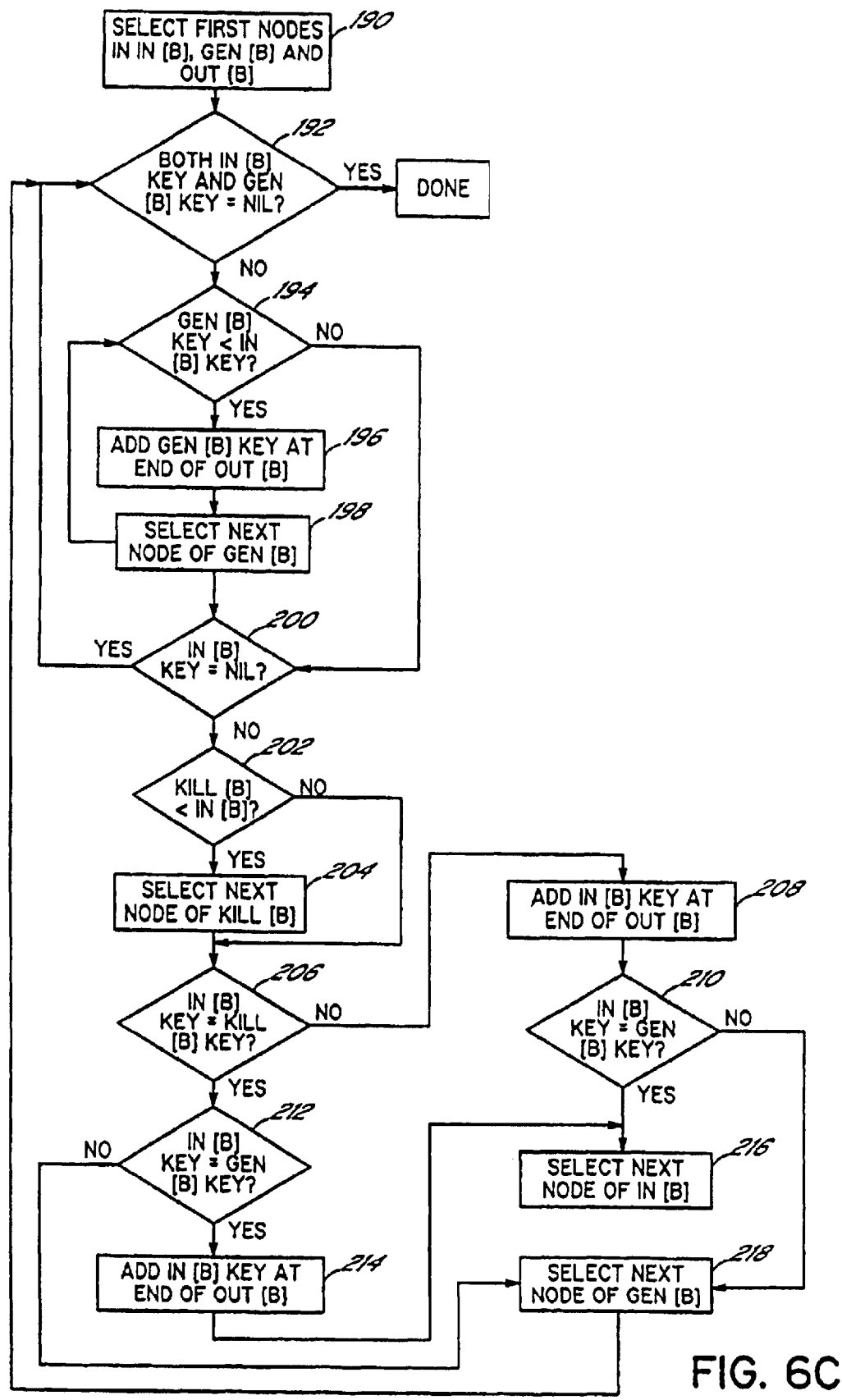
FIG. 6C is a flow chart of specific operations performed as part of simultaneously scanning three skip lists and adding to one list any nodes meeting certain conditions in the other two lists.

Referring now to FIG. 6C, the processing of step 142 (FIG. 5) can be described in more detail. In this step, the skip lists for in[B], gen[B] and kill[B] are walked together, adding to out[B] any nodes found in in[B] but not in kill[B].

To begin this process, in step 190 the first nodes of in[B], gen[B] and kill[B] are selected. Then, in step 192, the keys in the current nodes in in[B] and gen[B] are evaluated to determine whether these nodes are the NIL node (having the highest integer number as a key). If both of the current nodes are the NIL node, then processing is done. However, if this is not the case, then processing proceeds to step 194, in which the key of the current node in the gen[B] skip list is compared to the key in the current node in the in[B] skip list. If the key in the current node in the in[B] skip list follows the key in the current node in the gen[B] skip list, this indicates that there is at least one expression generated in the current block B, represented by a node in gen[B], that is not in in[B]; therefore, in this case, processing proceeds to step 196, where the key in the current gen[B] node is added to the end of out[B], thus including the generated expression in the set of expressions available upon exit from block B; thereafter, in step 198, the next node in gen[B] is selected, by following the level 1 pointer of the current node in gen[B], and then processing returns to step 194. This loop including steps 194, 196 and 198 is repeated until all of the elements which appear in gen[B] and are prior to the current element in in[B], have been added to the end of out[B]. (Note that because the present routine is performed during initialization of out[B], the set of expressions represented by out[B] is initially empty, and so it is not necessary to insert nodes into any middle points in out[B]. This means that the process of adding nodes can be fairly rapid. The last node of each size is stored in memory as nodes are added. Then, when adding a new node to the end of the list of size n, the last node of each height less than or equal to n has its pointer(s) updated to point to the new node. The new node then becomes the last node of size n.)

Eventually, by proceeding to subsequent nodes in the gen[B] skip list, eventually a node is reached in gen[B] which has a key that does not precede the key of the current in[B] node in the predetermined key order. In this situation, processing proceeds from step 194 to step 200, where it is determined whether the current node in the in[B] skip list is the NIL node. If so, then the end of the in[B] skip list has been reached, and processing returns directly to step 192.

However, if the end of the in[B] skip list has not been reached, then processing proceeds to step 202, in which the key of the current node of the in[B] skip list is compared to the key of the current node of the kill[B] skip list. The purpose of this and the following steps 204 and 206 is to determine whether the key of the current node of the in[B] skip list should be added to the out[B] skip list, and to take appropriate actions. If the key of the current node of the kill[B] skip list precedes the key of the current node of the in[B] skip list in the predetermined key order, then processing proceeds to step 204, in which the next node in the kill[B] skip list is selected (by following the level 1 pointer of the current node of the kill[B] skip list), and processing returns to step 202.

This loop between steps 202 and 204 is continued until the key of the current node in the kill[B] skip list does not precede the key of the current node of the in[B] skip list. Once this occurs, processing proceeds from step 202 to step 206, in which it is determined whether the key of the current node in the kill[B] skip list is equal to the key of the current node in the in[B] skip list. If so, then the key found in in[B] is also found in kill[B]; in such a situation, the key should only be added to out[B] if the key also appears in gen[B]. Stated another way, an expression which is available upon entry to a block, but is killed by that block, will not be available upon exit from the block unless the expression is also generated by the block. Accordingly, in this situation, processing proceeds to step 212, in which the key of the current node in the in[B] skip list is compared to the key of the current node in the gen[B] skip list. If the keys are equal, then the expression represented by the current key in the current node of the in[B] skip list is generated by the current block B, and accordingly processing continues to step 214, in which a node with this key is added to the end of the out[B] skip list. Thereafter, the next node of the gen[B] skip list is selected in step 216, and the next node of the in[B] skip list is selected in step 218, and processing returns to step 192.

If, in step 212, it is determined that the key of the current node in the in[B] skip list is not equal to the key of the current node in the gen[B] skip list, then the expression represented by the key of the in[B] node is not generated by the current block B. Accordingly, in this case, processing proceeds directly to step 218 to select the next node in in[B], and then returns to step 192.

Furthermore, if in step 206, it is determined that the key of the current node in the in[B] skip list is not equal to the key of the current node in the kill[B] skip list, then it is determined that the expression represented by the key in the current node of the in[B] skip list is available upon entry to block B and not killed by block B. In this case, processing proceeds to step 208, in which a node is added to the end of out[B] containing the key of the current node of in[B], thus effectively adding this expression to out[B]. Next, in step 210, the key of the current node of in[B] is compared to the key of the current node of gen[B]. If the keys are equal, then processing proceeds to step 216 to select the next node in gen[B] and then (in step 218) the next node in in[B] before returning to step 172. However, if the keys are unequal, then the key of the current node of gen[B] must follow the key of the current node in in[B], and accordingly processing proceeds directly to step 218 so that the next node is selected in only in[B] before proceeding to step 192.

Following the foregoing procedures, a skip list representation can be used for the sets in a dataflow analysis performed by a compiler, and in subsequent optimizations, substantially improving the efficiency of data storage as compared to the use of bit vectors.

It will therefore be appreciated that the invention provides significant advantages in terms of optimization of computer procedures during compilation, resulting in more efficient compilation. It will also be appreciated that numerous modifications may be made to the disclosed embodiments consistent with the invention. For example, in some programs each block in the CFG may kill a large volume of the universe of expressions. If this is the case, then it may be advantageous to represent the sets kill[B] as bit vectors in the manner shown in FIG. 1, rather than as skip lists. If this approach is taken, then steps 202, 204 and 206 of FIG. 6C would be replaced with a single step performing a comparison of the key of the current node of in[B] to the bit vector representing kill[B] to determine whether the key of the current node of in[B] is a member of kill[B]. If so, processing would proceed to step 212, and if not, processing would proceed to step 208. Other modifications may be made to the disclosed embodiments without departing from the spirit and scope of the invention. Therefore, the invention lies in the claims hereinafter appended.

What is claimed is:

1. A method of calculating approximations of sets of entry and exit properties for each basic block of a computer procedure prior to performance of an iterative dataflow analysis, each basic block being associated with a set of entry and exit properties, as well as property modifications caused by the basic block, wherein each iteration of the iterative dataflow analysis process does not increase the membership of said sets, the method comprising selecting and processing each basic block in a predetermined order by copying into the set of entry properties of a currently selected basic block, the exit set of properties from a previously selected and processed basic block, modifying the set of entry properties of the currently selected basic block in accordance with the property modifications caused by the currently selected basic block, to generate the exit properties for the currently selected basic block, and performing iterations of said iterative dataflow analysis.

2. The method of claim 1, wherein said predetermined order is a depth-first order.

3. The method of claim 1, wherein said entry and exit properties comprise expressions available upon entry and exit from each basic block.

4. The method of claim 3, wherein said modifications caused by a basic block comprise expressions generated by the basic block.

5. The method of claim 4, wherein said modifications caused by a basic block further comprise expressions killed by the basic block.

6. The method of claim 3, wherein said modifications caused by a basic block comprise expressions killed by the basic block.

7. The method of claim 1, wherein the entry properties of the currently selected basic block are copied from the exit properties of a control flow predecessor of the currently selected basic block.

8. The method of claim 1, wherein processing the current basic block further comprises removing from the entry properties of the currently selected basic block, any properties not found in the exit properties of all previously selected and processed basic blocks which are control flow predecessors of the currently selected basic block.

9. A computer system operating a compiler including an optimizer for calculating approximations of sets of entry and exit properties for each basic block of a computer procedure prior to performance of an iterative dataflow analysis, each basic block being associated with a set of entry and exit properties, as well as property modifications caused by the basic block, wherein each iteration of the iterative dataflow analysis process does not increase the membership of said sets, the optimizer selecting and processing each basic block in a predetermined order by copying into the set of entry properties of a currently selected basic block, the exit set of properties from a previously selected and processed basic block, modifying the set of entry properties of the currently selected basic block in accordance with the property modifications caused by the currently selected basic block, to generate the exit properties for the currently selected basic block, and performing iterations of said iterative dataflow analysis.

10. The computer system of claim 9, wherein said predetermined order is a depth-first order.

11. The computer system of claim 9, wherein said entry and exit properties comprise expressions available upon entry and exit from each basic block.

12. The computer system of claim 11, wherein said modifications caused by a basic block comprise expressions generated by the basic block.

13. The computer system of claim 12, wherein said modifications caused by a basic block further comprise expressions killed by the basic block.

14. The computer system of claim 11, wherein said modifications caused by a basic block comprise expressions killed by the basic block.

15. The computer system of claim 9, wherein the entry properties of the currently selected basic block are copied from the exit properties of a control flow predecessor of the currently selected basic block.

16. The computer system of claim 9, wherein processing the current basic block further comprises removing from the entry properties of the currently selected basic block, any properties not found in the exit properties of all previously selected and processed basic blocks which are control flow predecessors of the currently selected basic block.

17. A program product comprising:

(a) a program defining the implementation of an optimizer for a compiler which calculates approximations of sets of entry and exit properties for each basic block of a computer procedure prior to performance of an iterative dataflow analysis, each basic block being associated with a set of entry and exit properties, as well as property modifications caused by the basic block, wherein each iteration of the iterative dataflow analysis process does not increase the membership of said sets, the program product comprising instructions for selecting and processing each basic block in a predetermined order by copying into the set of entry properties of a currently selected basic block, the exit set of properties from a previously selected and processed basic block, modifying the set of entry properties of the currently selected basic block in accordance with the property modifications caused by the currently selected basic block, to generate the exit properties for the currently selected basic block, and performing iterations of said iterative dataflow analysis; and (b) a signal bearing media bearing the program.

18. The program product of claim 17, wherein said predetermined order is a depth-first order.

19. The program product of claim 17, wherein the signal bearing media is a transmission type media.

20. The program product of claim 17, wherein the signal bearing media is a recordable media.

* * * * *